United States Patent [19]

Kurtzberg et al.

[11] Patent Number: 5,764,824

[45] Date of Patent: *Jun. 9, 1998

[54] CLUSTERING MECHANISM FOR IDENTIFYING AND GROUPING OF CLASSES IN MANUFACTURING PROCESS BEHAVIOR

[75] Inventors: Jerome M. Kurtzberg; Menachem Levanoni, both of Yorktown Heights, N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 519,229

[22] Filed: Aug. 25, 1995

[51] Int. Cl.$^6$ .................................................. G06F 15/18
[52] U.S. Cl. ........................... 395/20; 706/14; 706/904
[58] Field of Search ........................... 395/20, 11, 27; 382/159, 130, 37, 281, 9, 10; 634/419.19; 364/807, 468.26; 327/355; 324/306; 342/94

[56] References Cited

U.S. PATENT DOCUMENTS

| | | | |
|---|---|---|---|
| 4,932,065 | 6/1990 | Feldgajer | 382/177 |
| 5,204,625 | 4/1993 | Cline et al. | 324/306 |
| 5,255,349 | 10/1993 | Thakoor et al. | 395/27 |
| 5,263,120 | 11/1993 | Bickel | 395/11 |
| 5,303,311 | 4/1994 | Epting et al. | 382/197 |
| 5,325,298 | 6/1994 | Gallant | 704/9 |
| 5,329,596 | 7/1994 | Sakou et al. | 382/226 |
| 5,396,252 | 3/1995 | Kelly | 342/94 |
| 5,430,810 | 7/1995 | Saeki | 382/281 |
| 5,465,308 | 11/1995 | Hutcheson et al. | 382/159 |
| 5,479,523 | 12/1995 | Gaborski et al. | 382/159 |
| 5,506,801 | 4/1996 | Tawel | 364/807 |
| 5,530,393 | 6/1996 | Guerrieri et al. | 327/355 |
| 5,535,128 | 7/1996 | Laube et al. | 364/468.26 |
| 5,555,317 | 9/1996 | Anderson | 382/159 |
| 5,598,481 | 1/1997 | Nishikawa et al. | 382/130 |

OTHER PUBLICATIONS

Razaz, A fuzzy c–means clustering placement algorithm. 1993 IEEE international on circuits and systems, pp. 2051–2054, May 6, 1993.

Cheng, A branch and bound clustering algorithm. IEEE transactions on systems, Man and cybernatics, pp. 895–898, May 1995.

Dave et al., Adaptive fuzzy c–shells clustering and detection of elipses, IEEE transactions on neural network, pp. 643–662, Sep. 1992.

Heragu, Group technology and cellular manufacturing, IEEE transactions on systems, Man and cybernatics, pp. 203–215, Feb. 1994.

Swaminathan et al., Decomposition of (0.1) matrices, IEEE transactions on computers, pp. 629–633, May 1994.

Malakooti et al., An unsuoervised neural networks approach for machine part cell design, 1994 IEEE International conference on neural network, pp. 665–670, Jul. 2, 1994.

Taub et al., A symmetric matrix criterion for polynomial root clustering, IEEE transactions on circuits and systems, pp. 243–248, Feb. 1990.

Zhao et al., A novel fuzzy entropy clustering algorithm. Proceedings of the third IEEE conference on fuzzy systems, pp. 636–641, Jun. 29, 1994.

*Primary Examiner*—Allen R. MacDonald
*Assistant Examiner*—Sanjiv Shah
*Attorney, Agent, or Firm*—Whitham, Curtis & Whitham; Stephan C. Kaufman

[57] ABSTRACT

A clustering technique groups manufacturing data in clusters of similar parametric behavior. Each cluster groups data points which satisfy a given criterion of process behavior similarity. These data may be widely separated in time and thus need not form time ordered clusters. The technique operates in multi-dimensional parameter space and can represent process data that is characterized with multiple performance measures. The technique produces a partition of the data into the minimum number of clusters which satisfy the criterion that all data in the grouping are within a given threshold distance from a cluster nucleus. In addition, the clustering mechanism according the invention is computationally rapid.

3 Claims, 5 Drawing Sheets

|    | Z1 | Z2 | Z3 | Z4 | Z5 | Z6 | Z7 | Z8 |
|----|----|----|----|----|----|----|----|----|
| Z1 | 1  | 1  |    | 1  | 1  | 1  |    |    |
| Z2 | 1  | 1  | 1  | 1  |    | 1  |    |    |
| Z3 |    | 1  | 1  | 1  |    | 1  | 1  |    |
| Z4 | 1  | 1  | 1  | 1  |    | 1  |    |    |
| Z5 | 1  |    |    |    | 1  |    |    |    |
| Z6 | 1  | 1  | 1  | 1  |    | 1  |    |    |
| Z7 |    | 1  |    |    |    |    | 1  |    |
| Z8 |    |    |    |    |    |    |    | 1  |

CLUSTERING MECHANISM FOR IDENTIFYING AND GROUPING OF CLASSES IN MANUFACTURING PROCESS BEHAVIOR

BACKGROUND OF THE INVENTION

1. Field of the Invention

The present invention generally relates to controlling and optimizing manufacturing processes and, more particularly, to a mechanism for data clustering to enable the identification and grouping of classes of similar process behavior to solve manufacturing performance problems and reduce process variability.

2. Background Description

Manufacturing processes undergo performance variations over time due to changes in their environment, for example, tools, specifications, process parameters and materials. The root causes of these variations are seldom known. Thus, it is not clear how to solve manufacturing performance problems and reduce process variability.

There is a strong need for analysis of process variation. Therefore, there is a need for grouping process data in clusters of similar process behavior, independent of time. Within each cluster, process conditions can be examined to determine the reasons for the particular behavior. Consequently, processes can be improved via identification of clusters representing good process behaviors, and those representing poor process behavior.

SUMMARY OF THE INVENTION

It is therefore an object of the present invention to provide a clustering technique which leads to a desired process improvement.

According to the invention, there is provided a novel means for grouping manufacturing data in clusters of similar parametric behavior. Each cluster groups data points which satisfy a given criterion of process behavior similarity. These data may be widely separated in time and thus need not form time ordered clusters. The technique operates in multi-dimensional parameter space and can represent process data that is characterized with multiple performance measures. The technique produces a partition of the data into the minimum number of clusters which satisfy the criterion that all data in the grouping are within a given threshold distance from a cluster nucleus. In addition, the clustering mechanism according the invention is computationally rapid.

BRIEF DESCRIPTION OF THE DRAWINGS

The foregoing and other objects, aspects and advantages will be better understood from the following detailed description of a preferred embodiment of the invention with reference to the drawings, in which:

FIG. 5 is a relationship matrix showing the relations of the data points;

DETAILED DESCRIPTION OF A PREFERRED EMBODIMENT OF THE INVENTION

Figure 1:
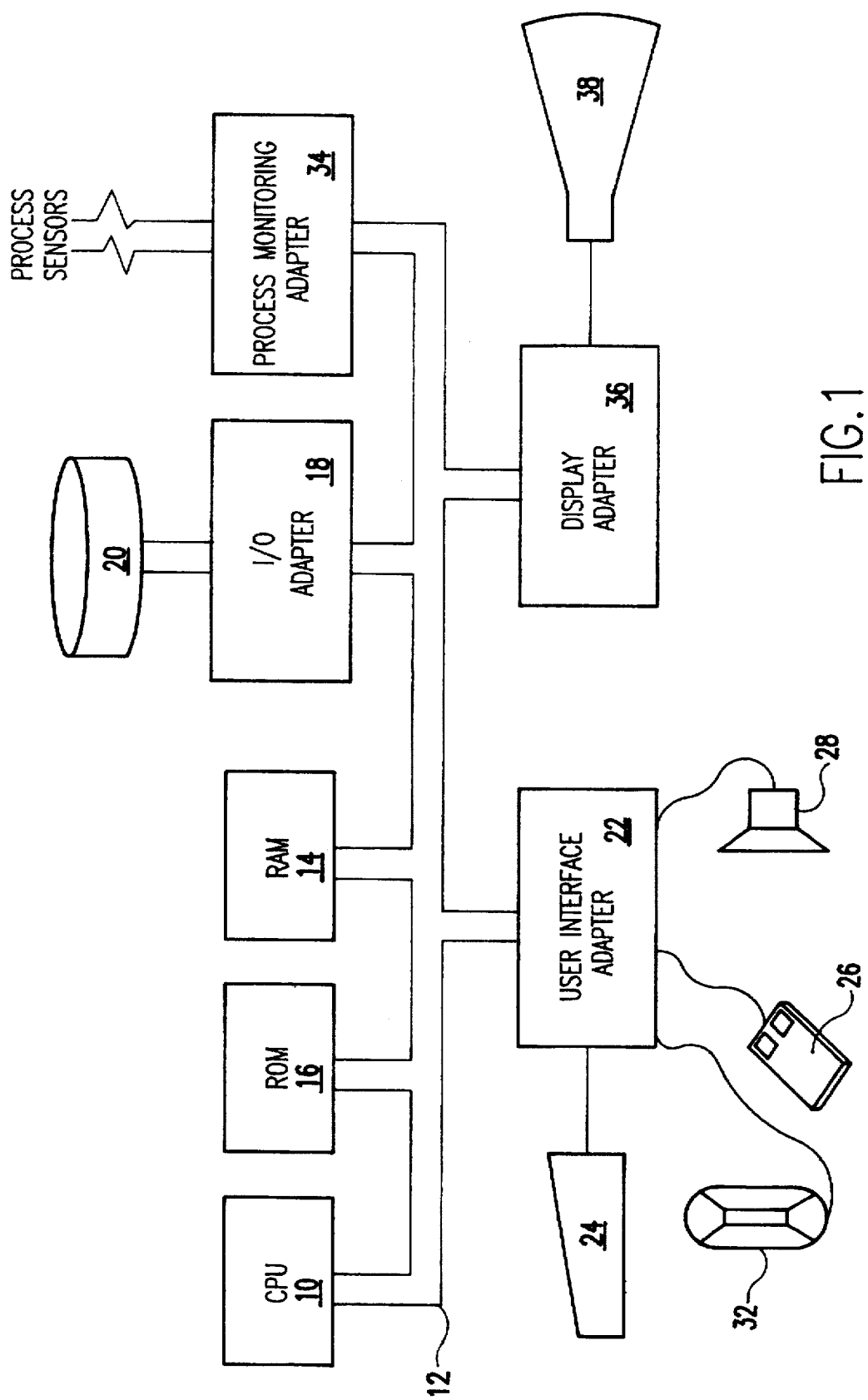
FIG. 1 is a block diagram showing a hardware configuration on which the subject invention may be implemented.

Referring now to the drawings, and more particularly to FIG. 1, there is shown a representative hardware environment which may be a personal computer, such as the International Business Machines (IBM) Corporation's Personal System/2 (PS/2) family of Personal Computers. The hardware includes a central processing unit (CPU) 10, which may conform to Intel's X86 architecture or may be a reduced instruction set computer (RISC) microprocessor such as IBM's PowerPC microprocessor. The CPU 10 is attached to a system bus 12 to which are attached a read/write or random access memory (RAM) 14, a read only memory (ROM) 16, an input/output (I/O) adapter 18, and a user interface adapter 22. The RAM 14 provides temporary storage for application program code and data, while ROM 16 typically includes the basic input/output system (BIOS) code. The I/O adapter 18 is connected to one or more Direct Access Storage Devices (DASDs), here represented as a hard disk drive 20. The hard disk drive 20 typically stores the computer's operating system (OS), such as IBM's OS/2 operating system, and various application programs, each of which are selectively loaded into RAM 14 via the system bus 12. The user interface adapter 22 has attached to it a keyboard 24, a mouse 26, and/or other user interface devices (not shown). The personal computer or workstation also includes a display 38, here represented as a cathode ray tube (CRT) display but which may be a liquid crystal display (LCD) or other suitable display. The display 38 is connected to the system bus 12 via a display adapter 36. Finally, the personal computer or workstation includes a process monitoring adapter 34 connected to sensors or measuring devices (not shown) which generate data at points in a manufacturing process being monitored. The adapter 34 may include, for example, an analog-to-digital (A/D) converter and a multiplexer to generate multiple digital data from a plurality of analog sources, which data is supplied to the CPU 10 via the bus 12.

Figure 2:
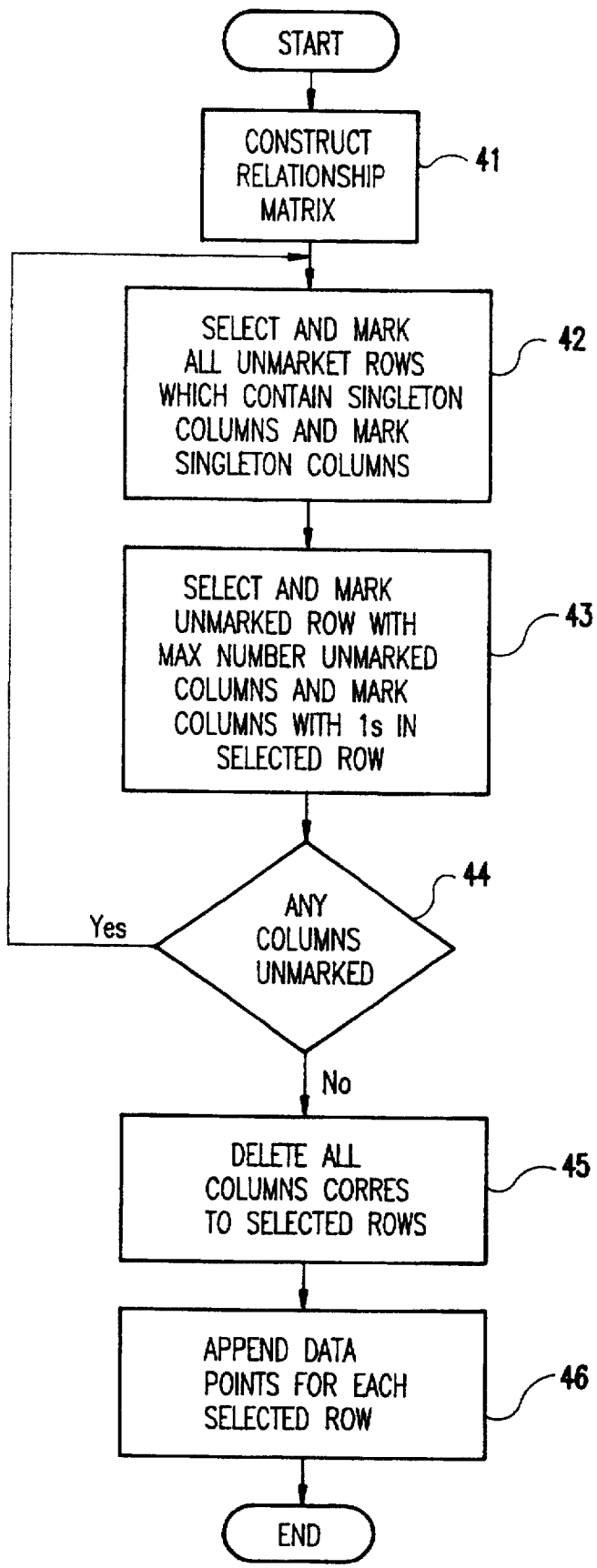
FIG. 2 is a flow diagram showing the logic of the computer implemented process according to a preferred embodiment of the invention.

FIG. 2 is a flow diagram which illustrates the logic of the computer implemented procedure according to a preferred embodiment of the invention. Given a process with n data points Zi, i=1, . . . ,n, the first step in function block 41 is to form an n×m matrix C, where C(i,j)=1 if Zi and Zj are within "distance" r of one another, and 0 otherwise. Distance is an abstract measure of closeness. It may represent the normal Euclidean distance between the measurement values of two data points. It may represent the correlation between two process variables, or any other measure of proximity. The data itself could represent process yield, process quality, or any other process parameter. The distance r is supplied by the user and represents similarity threshold suitable for data cluster analysis. A threshold based on the standard deviation of the process data can be selected as a default.

The second step in function block 42 is to select for nuclei of clusters all unmarked rows which contain unmarked columns with single 1s in them, i.e., all rows C(i) with C(i,j)=1, j=1, . . . ,n, and SUM over j of C(i,j)=1. These columns are termed "singleton" columns. All singleton columns are marked, and all selected rows are marked. The third step in function block 43 is to select for further nuclei of clusters an unmarked row with the maximum number of unmarked columns. The selected row is marked, and all columns which contain 1s in the selected row are marked. A test is then made in decision block 44 to determine if any columns remain unmarked. If any columns remain unmarked, the process returns to step two in function block 42. When all columns are marked, the process goes to the next step in function block 45. The fourth step in function block 45 is to delete all columns corresponding to selected rows; that is, those which are nuclei of clusters. In the fifth step in function block 46, for a selected row (i.e., nucleus of clusters), append to the nucleus, as cluster members, all data points corresponding to 1s in the existing columns (all of which are marked) of the selected row. Then delete the columns associated with the selected cluster members for that row. This process is repeated until all cluster nuclei, i.e., all selected rows, are treated. Note that all columns have now been deleted.

Figure 3:
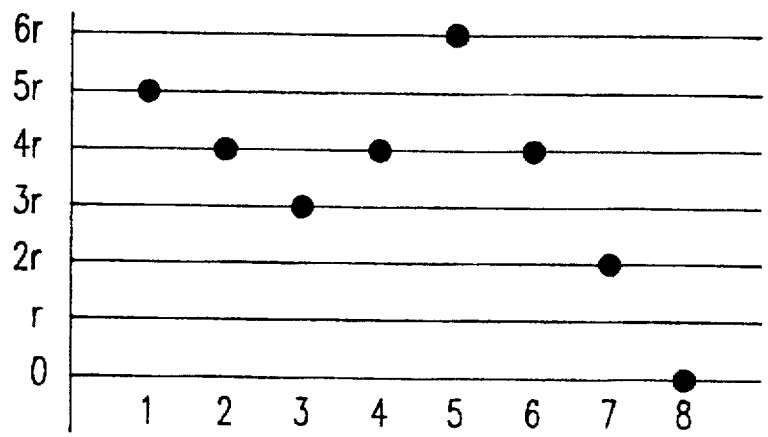
FIG. 3 is a graph showing eight data points in a hypothetical manufacturing process.
Figure 4:
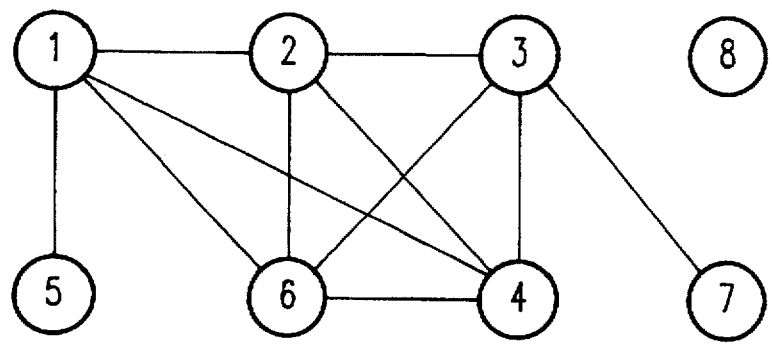
FIG. 4 is a relationship graph showing the relationships of the eight data points of FIG. 3.

The following example, consisting of eight data points, illustrates the technique. FIG. 3 displays eight sequential data points in which each level denotes the threshold r. This display may be displayed on display 38 of the computer system shown in FIG. 1. FIG. 4 is a graph representing the relationship of points to one another. The nodes represent the data points and the edges denote the relationship between the points. Two nodes (points) are connected by an edge if an only if they are within distance r of one another. FIG. 5 illustrates the relationship matrix C in which $C(i,j)=1$ if points I and j are within the threshold distance r, and 0 otherwise. For example, node 1 in FIG. 4 is connected to nodes 2, 4, 5, and 6. Thus, in row Z1 of the relationship matrix in FIG. 5, 1s are entered in columns Z1 (since node 1 is connected to itself), Z2, Z4, Z5, and Z6. Note that node 8 in FIG. 4 is not connected to any other node, so a 1 is entered only in row Z8, column Z8.

The process shown in FIG. 2 is illustrated using the relationship matrix of FIG. 5. Step one, function block 41, creates the relationship matrix C shown in FIG. 5. Step two, function block 42, selects Z8 for a cluster nucleus (since it is a singleton) and marks row 8 and column 8. Step 3, function block 43, selects Z1 as another cluster nucleus (since it is an unmarked row which contains a maximum number of unmarked columns with is, and marks row 1 and columns 1, 2, 4, 5, and 6. Since not all columns have been marked, step two is revisited. Since no singletons exist, nothing is generated. Step three then is executed which results in the selection of Z3 as the next (and last) cluster nucleus. Row 3 and columns 3 and 7 are then marked. Step four, function block 45, is now invoked (since all columns are marked). Consequently, columns 8, 1 and 3 are deleted. Step five, function block 46, appends cluster members to their respective nuclei. Z8, the first nucleus, is a singleton and hence is the only member. Z1, the next nucleus, has Z2, Z4, Z5, and Z6 appended as cluster members, and columns 2, 4, 5 and 6 are deleted. Z3, the last nucleus, has Z7 (the only remaining unmarked column) appended as the cluster member, and column 7 is deleted. The process terminates since all columns are deleted.

Figure 6:
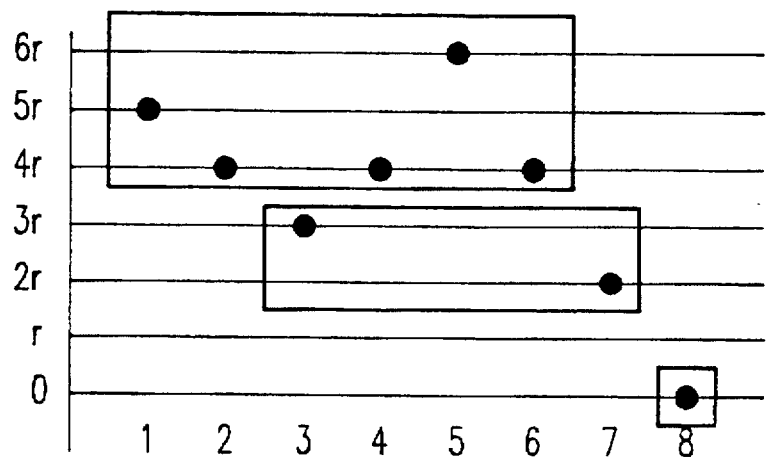
FIG. 6 is the graph of FIG. 3 showing the data point clusters identified according to the procedure of FIG. 2.
Figure 7:
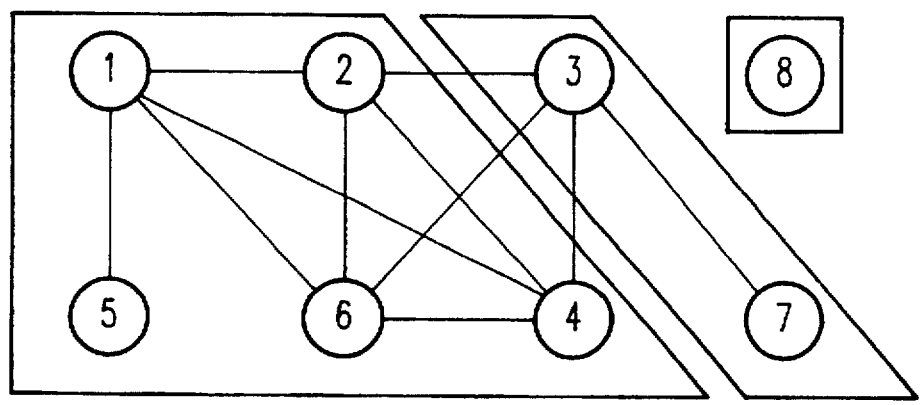
FIG. 7 is the relationship graph of FIG. 4 showing the data point clusters identified according to the procedure of FIG. 2.

The resulting partition of the data points consists of three clusters. These are shown in FIGS. 6 and 7, and the data points may be displayed in clusters on display 38. In the alternative or in addition to displaying the clustered data points, a printed output may be generated to provide an archival record. Note that the resultant partition into three clusters is both necessary and sufficient for a minimal partition. Note also that the technique is computationally fast and is highly suitable for computer implementation.

As a concrete example, assume the data points shown in FIG. 3 are the concentration values of a chemical solution produced by four machines over two shifts. Thus, data points 1 to 4 are the concentration values produced by machines A, B, C, and D during a first shift, and data points 5 to 8 are the concentration values produced by these same machines A, B, C, and D during a second shift. The machines are further assumed to be operated by different personnel during the two shifts and it is generally desirable to keep the concentration values produced by the machines within a tolerance "r" of a target of, say, the $5r$ threshold since the machines are part of a sequential processing of product. In other words, it is neither desirable to generate an excess or deficient concentration in order to assure good production.

The clustering produced by the process according to the invention as illustrated in FIG. 7 quickly identifies areas of investigation in the production line. Note for example that machines A and B are meeting the desired concentration during both shifts, as indicated by data points 1 and 5 for machine A and data points 2 and 6 for machine B. Note also that machine D meets the concentration requirements during shift 1 but not during shift 2; i.e., data point 4 versus data point 8. Finally, note that machine C is failing to meet the concentration requirements during both shifts. From this information, an investigation might be made as to whether machine C is failing and needs repair or replacement. As to machine D, there are several possibilities that may need investigation. One might be that the worker in the second shift is not sufficiently well trained to operate machine D at peak efficiency; however, for this simple example, there may not be enough data to identify the problem as a personnel problem. It could be that machine D is about to catastrophically fail and may do so in a subsequent shift, or the failure of the machine may indicate the need for a repair caused, for example, by one of the shift workers accidentally spilling coffee on part of the machine (that is, a common manufacturing mishap).

This concrete example is admittedly a simple one in which the analysis could readily have been made by a visual interpretation of the data points of the graph of FIG. 3. The purpose of the example is to illustrate in a simple way how the process according to the invention makes an analysis of far more complex situations which do not admit of a visual interpretation of the data points. Because the process is computationally fast and efficient, it can be run either periodically or continuously during a production process as part of monitoring system. In this way, potential problems in the production process can be identified early and remedial action taken before a failure in the production process occurs.

While the invention has been described in terms of a single preferred embodiment, those skilled in the art will recognize that the invention which is suitable for analysis, control and optimization of a process or as set of processes can be practiced with modification within the spirit and scope of the appended claims.

Having thus described our invention, what we claim as new and desire to secure by Letters Patent is as follows:

1. A computer implemented method for clustering data which represents process behavior to enable identification and grouping of classes of similar process behavior in a manufacturing process comprising the steps of:

(a) monitoring a manufacturing process with one or more sensors and selecting therefrom n data points $Z_i, I=1, \ldots, n$ representative of process behavior;

(b) forming an n×m relationship matrix C, where $C(i,j)=1$ if $Z_i$ and $Z_j$ are within a distance r of one another and 0 otherwise, where r is a measure of closeness of data points;

(c) selecting all unmarked rows of the relationship matrix which contain unmarked columns with single 1s in them, these columns being termed "singleton" columns, and marking all singleton columns and all selected rows;

(d) selecting for further nuclei of clusters an unmarked row with a maximum number of unmarked columns and marking the selected row and marking all columns which contain is in the selected row;

(e) if any columns remain unmarked, repeating steps (c) and (d);

(f) when all columns are marked, deleting all columns corresponding to selected rows in the relationship matrix which are nuclei of clusters;

(g) for a selected row, appending to the nucleus, as cluster members, all data points corresponding to 1s in the existing columns of the selected row and deleting the columns associated with the selected cluster members for that row; and (h) repeating step (g) until all selected rows representing cluster nuclei are treated so that all columns in the relationship matrix are deleted.

2. A computer apparatus for monitoring a manufacturing process and clustering data which represents process behavior to enable identification and grouping of classes of similar process behavior in the manufacturing process comprising:

input means for receiving data from one or more manufacturing process sensors, said data corresponding to n data points $Z_i$, $I=1, \ldots, n$, which are to be clustered;

a central processing unit connected to said input means for receiving said data;

said central processing unit forming an n×m relationship matrix C, where $C(i,j)=1$ if $Z_i$ and $Z_j$ are within a distance r of one another and 0 otherwise, where r is a measure of closeness of data points, said central processing unit selecting all unmarked rows of the relationship matrix which contain unmarked columns with single 1s in them, these columns being termed "singleton" columns, and marking all singleton columns and all selected rows, said central processing unit selecting for further nuclei of clusters an unmarked row with a maximum number of unmarked columns and marking the selected row and marking all columns which contain is in the selected row, and when all columns are marked, said central processing unit deleting all columns corresponding to selected rows in the relationship matrix which are nuclei of clusters;

said central processing unit further, for a selected row, appending to the nucleus, as cluster members, all data points corresponding to 1s in the existing columns of the selected row and deleting the columns associated with the selected cluster members for that row until all selected rows representing cluster nuclei are treated so that all columns in the relationship matrix are deleted; and display means connected co said central processing unit for displaying data points representing the data received from the manufacturing process;

said display means being further responsive to said central processing unit for displaying grouped data points as clusters.

3. The computer implemented method in claim 1 further comprising the step of:

(i) displaying a representation of clustered said data points.

* * * * *